(12) United States Patent
Kahl

(10) Patent No.: US 7,517,499 B2
(45) Date of Patent: Apr. 14, 2009

(54) FLOW CHAMBER

(75) Inventor: Johan-Valentin Kahl, Martinsried (DE)

(73) Assignee: Ibidi GmbH, Martinsried (DE)

( * ) Notice: Subject to any disclaimer, the term of this patent is extended or adjusted under 35 U.S.C. 154(b) by 596 days.

(21) Appl. No.: 10/491,016

(22) PCT Filed: Sep. 25, 2002

(86) PCT No.: PCT/EP02/10770

§ 371 (c)(1),
(2), (4) Date: Sep. 20, 2004

(87) PCT Pub. No.: WO03/029788

PCT Pub. Date: Apr. 10, 2003

(65) Prior Publication Data

US 2005/0019231 A1    Jan. 27, 2005

(30) Foreign Application Priority Data

Sep. 28, 2001 (DE) ............................... 101 48 210
Sep. 28, 2001 (DE) ............................. 201 16 019 U

(51) Int. Cl.
*B01L 3/00* (2006.01)
(52) U.S. Cl. ..................................................... 422/102
(58) Field of Classification Search ................. 422/102
See application file for complete search history.

(56) References Cited

U.S. PATENT DOCUMENTS 3,759,374 A * 9/1973 Helger et al. ............... 206/431
4,113,692 A * 9/1978 Wambach .................... 524/537
4,227,810 A * 10/1980 Sandrock et al. ............ 356/246
4,237,096 A * 12/1980 Popoff et al. ................ 422/102
4,299,918 A    11/1981 Popoff et al.
4,472,357 A * 9/1984 Levy et al. .................. 422/102
5,786,182 A    7/1998 Catanzariti et al.
5,922,604 A    7/1999 Stapleton et al.
6,159,749 A    12/2000 Liu

FOREIGN PATENT DOCUMENTS

DE          2829796 B2      2/1979

(Continued)

*Primary Examiner*—Walter D Griffin
*Assistant Examiner*—Bobby Ramdhanie
(74) *Attorney, Agent, or Firm*—IP Strategies

(57) ABSTRACT

A flow chamber (1) made of plastics as an object carrier for light-microscopic examinations comprised at least one channel (4) in a base plate (2), said channel having a width of 0.01 to 20 mm and a height of 0.01 to 5 mm. One liquid reservoir (3, 3') each is connected to the inlet and outlet opening (6, 6') of the channel, whereby a communicating system is generated. The bottom and/or the cover of this chamber is made of a high-class plastic material and may be functionalized. The inlet and outlet portions of the channel may be formed by a rounding (7) of the channel edges or by a surface treatment in a manner that drop formation is prevented and the flow is therefore not obstructed.

In a method of sample preparation for light-optical microscopic examinations, a sample flow is generated by a system of communicating pipes, in that a reservoir of a solution with the sample is connected via a third channel with at least one further reservoir and the filling level of the reservoirs differs at the beginning of the examination.

30 Claims, 4 Drawing Sheets

FOREIGN PATENT DOCUMENTS

| | | |
|---|---|---|
| DE | 36 50 610 T2 | 7/1986 |
| DE | 43 34 677 C1 | 10/1993 |
| DE | 4334677 C1 | 7/1994 |
| DE | 3853457 T2 | 10/1995 |
| EP | 0308494 B1 | 3/1995 |
| JP | 63241337 A | 10/1988 |
| JP | 64026125 | 2/1989 |
| JP | 09196739 A | 7/1997 |
| JP | 11075812 A | 3/1999 |
| JP | 2000002677 A | 1/2000 |
| JP | 2000121547 A | 4/2000 |
| JP | 2001194296 A | 7/2001 |
| WO | WO-0072968 A1 | 12/2000 |

\* cited by examiner

FLOW CHAMBER

FIELD OF THE INVENTION

The present invention refers to a flow chamber for light-optical microscopic and light-spectroscopic examinations according to the preamble of claim 1 and to a method for the preparation of samples for light-optical microscopic examinations according to claim 16.

The invention particularly refers to a flow chamber by means of which movable and immovable molecules, macromolecules or cells can be examined by different light-optical microscopic and spectro-optical techniques (e.g. high-resolution microscopy, fluorescence microscopy, phase contrast microscopy, confocal microscopy, etc.).

BACKGROUND OF THE INVENTION

Object carriers and Petri dishes for samples to be examined are used in the most variable examination methods and must therefore meet many different demands. Many biological-medical examinations are for instance carried out by the aid of light-optical microscopic and/or spectroscopic techniques. Besides the pure light-optical microscopy (e.g. for the examination of cells), methods of the high-resolution, fluorescence, phase contrast or confocal microscopy as well as the UV spectroscopy are used. Combinations of these methods are also used. Particularly, the analysis of fluorescence signals is of decisive meaning to prove specific reactions.

This is mostly implemented by the qualitative analysis of fluorescence of a solution which contains the molecules, macromolecules or cells to be examined (e.g. via microscopy or spectroscopy). The substance to be examined as well as "verification molecules" for these substances, such as anti-bodies, are in solution. This leads to the fact that relatively large amounts of the molecules to be proven as well as the substances (or cells) to be examined must be used.

The sample chambers used for examinations of this type, in which the solutions with the substances are located, are usually made of glass or silica glass. Plastic containers are hardly used for this type of examination due to the poor optical property of most of the plastic materials (compared to glass). Exceptions are plastic dishes that are open towards the microscope or the spectrometer, so that the light emitted by the molecule does not have to pass plastics on its way to the detector.

A Petri dish is for instance known from DE 3102571 A1, which consists of plastics and which has a thin bottom of 0.17 mm for the microscopy. This Petri dish is particularly used for the cell microscopy, however, it does not comprise a flow system. It does also not have a channel system or reservoir to apply a defined flow. In this shell, any specific modifications of the plastics adapted to the substances to be examined are also not provided.

A monitoring chamber for microscopy in connection with a flow system connected is known from U.S. Pat. No. 5,170,286. This is a "sandwich" construction, which basically consists of a special support into which microscopy cover slips are inserted that are fixed by cover plates. Thus, this system consists of at least five different elements that must be assembled before every experiment. Thereby, sterile work is for instance only ensured with expensive provisions. The cover slips used, the support and the cover plates must be cleaned between the experiments. The flow rate must be generated in this chamber by hose connections to a reservoir not attached on the chamber. This includes the risk of the formation of air bubbles in the flow system.

A surface treatment or functionalization for the specific immobilization of molecules or cells of the cover slips used is not provided. The cover slips used must be sealed by seal rings. Experience shows that this often leads to leakage and to the fact that molecules in the solution change their functional structure due to a contact with the seal ring, or that they absorb to the seal ring. This also applies to the support in which the channels are inserted.

A micro-channel system made of acrylic glass is described in WO 97/38300, which serves for the electrophoretic separation. However, the micro-channel is not used for rinsing through liquids or for high-resolution microscopy. The acrylic glass does also not have sufficiently favorable optical properties to carry out high-class microscopy. The inner walls of this channel system are also not surface-treated, with the purpose of being able to analyze specific reactions there. The analysis of the macromolecules introduced into this channel system takes place in a gel introduced. Molecules introduced into the channel are also not moved by an applied hydrodynamic flow but by use of electrical fields.

Most of the techniques with conventional sample chambers only allow a quantitative but not a qualitative analysis of the signals. The solvent exchange, e.g. when using a glass cuvette for dilution, is very elaborate. The simple exchange of liquids in a sample chamber is, however, necessary to prove special reactions of molecules in the liquid with other molecules, macromolecules, cells, etc. or to rinse out superfluous molecules, which are located in the liquid. Moreover, excessive molecules may weaken or extinguish the fluorescence signal or spectrum of the molecule or molecule complex to be examined.

BRIEF SUMMARY OF THE INVENTION

It is the object of the present invention to develop a flow chamber, which allows a quick and simple flow and exchange of liquids, which moreover enables a trouble-free implementation of the above-mentioned examinations and by means of which the quantity of verification molecules required for an examination can be reduced. Furthermore, a flow chamber is to be provided, which is simple to manufacture and to operate.

A further object of the invention is to provide a method, which facilitates the implementation of the above-mentioned examination methods and which discloses new examination possibilities.

This object is solved by a flow chamber according to the characterizing features of claim 1 and by the method according to claim 16. Advantageous embodiments can be derived from the dependent claims.

According thereto, a flow chamber made of plastics as an object carrier for light-optical microscopic examinations comprises at least one channel in a base plate, said channel having a preferred width of 0.01-20.0 mm and a preferred height of 0.01-5 mm. The inlet opening as well as the outlet opening of the channel is connected to a liquid reservoir arranged on the upper side. By the connection of the two reservoirs through the channel, a communicating system can be produced, or a communicating system is produced.

The at least two liquid reservoirs are preferably arranged on the one surface of the base plate, and the at least one channel is arranged on the opposing surface of the base plate. Thus, the flow chamber can be used in an advantageous manner for methods of inverse microscopy. The microscope is particularly not obstructed by the liquid reservoirs, since these reservoirs are arranged on the other side of the base plate.

The at least one channel preferably comprises a trench formed in the base plate. By applying a cover onto the base plate of the flow chamber, the trench can be closed and a closed channel can thereby be formed. The cover may for instance be formed in the form of a foil. The communicating system is then generated by applying the cover. Thus, a flow chamber with a cover is provided according to the invention.

In the method according to the invention, a sample flow through a system of communicating pipes is generated, in that a reservoir of a solution with the sample is connected via a thin channel with at least one further reservoir, and the filling level of the reservoirs is different at the beginning of the examination. A flow chamber is preferably used for carrying out the method, as it is described above.

A sample liquid to be examined is filled into one of the liquid reservoirs in order to be examined. The other reservoir may, for the time being, remain empty or it may partially be filled with a suitable solution. However, it is essential that the liquid level in the two reservoirs is different. In this case, the liquid flows through the channel due to the gravitation and capillary forces without additional means being required.

An uncomplicated and at the same time reliable flow of a sample through the channel to be examined is ensured by the flow chamber according to the invention. Examinations of molecules etc. by the aid of these flow chambers can therefore be carried out quickly and efficiently, since a complicated external channel system does not have to be connected. By the direct proximity of the sample reservoir at the examination location, i.e. the channel, the sample quantity required can significantly be reduced. The above-mentioned disadvantages of conventional sample chambers are therefore avoided.

In a preferred embodiment of the invention for highly sensitive examination methods, the flow chamber consists of an optically high-class plastic material, i.e. the plastic material does not have a birefringence and/or auto-fluorescence. For this purpose, cyclic olefins or polycarbonates may for instance be used. Furthermore, the bottom and/or the cover of the channel of the flow chamber, according to the requirements of the examination method used, preferably has a thickness which is smaller than 190 µm. Thereby, optimal properties are achieved for a plurality of examination methods.

The liquid reservoirs advantageously have a diameter of 1 to 20 mm and a height of 3 to 30 mm. They can also be formed in a funnel-like manner, wherein these funnels open into the inlet and outlet opening of the channel. Thus, no residue of the sample remains in the liquid reservoir and the required sample quantity can further be reduced for an examination.

According to an advantageous embodiment, the flow chamber and/or the cover at least comprise a portion with a predetermined gas permeability. This gas permeability may particularly be formed for certain cases only, such as $CO_2$, $O_2$ and $N_2$. Thereby, preferred gassings e.g. of cells in the flow system can be enabled by differently large gas atmospheres surrounding the chamber. The local gas permeability may particularly not only be adjusted by the material but also by the material thickness. Furthermore, different portions may have a different gas permeability so that only certain portions of the chamber are supplied with certain gases.

Preferably, several covers (e.g. foils) may be arranged on top of each other on the base plate. The gas permeability may be changed by removing or adding covers. The covers may particularly be arranged such that they can easily be removed.

In a further preferred embodiment of the flow chamber according to the invention, the edges of the channel, by means of which this channel abuts on the input and output openings, are rounded. This prevents the generation of a drop at the outlet and inlet of the sample liquid caused by surface tension, and an unobstructed flow of the liquid is ensured. The surfaces of the channel may also have a hydrophilic or hydrophobic surface in the area of the outlet and inlet, depending on the given properties of the liquid used, to utilize wetting phenomena for the liquid transport.

According to a preferred embodiment, at least a portion of the flow chamber and/or of the cover has a surface coating. Thereby a predetermined adhesion (e.g. especially weak or strong) of cells can be achieved. Respective surface structures may be between 10 µm and some centimeters.

For certain examination methods, such as interaction examinations between molecules, it is desirable to immobilize the molecules, macromolecules or cells. For this purpose, an inner surface of the channel may be surface-treated or functionalized, e.g. by molecule groups such as —COOH, —NH2, ketones, alcohols or by macromolecules, such as DNA or proteins. The samples immobilized in this surface may have a characteristic change of their spectrum or emit a characteristic fluorescence signal in case of reaction with a solved substance (e.g. a molecule). By the aid of the flow chamber according to the invention it is possible to rinse out the solved molecules so that this signal may quantitatively be analyzed at a low flow velocity.

The chamber, i.e. the liquid reservoirs and the base plate, consist of one piece in a preferred embodiment. Thus, elements do not exist that must be purified before treatment, and thus it can be kept sterile with few effort. It does also not have to be elaborately assembled before use. If the flow chamber is formed with channels (trenches) open towards the surface, as described above, only a cover must be applied. In this embodiment, it is normally provided for single use only.

According to an advantageous embodiment, the flow chamber is formed as an injection molding element. This leads to an especially simple and inexpensive manufacturing mode.

According to a further advantageous development, a frame is arranged on the surface of the base plate, at which the at least one channel is provided. The frame may particularly be arranged along the entire circumference or along part of the circumference of the base plate. This enables a precise arrangement of the cover on the base plate. The height of the frame may be equal to the thickness of the cover. According to a preferred alternative, the frame is higher than the thickness of the cover, which is why the frame also serves as a spacer, which prevents the cover from being scratched. The frame preferably has a height of between 1 µm and 1 mm and a width of 1 µm and 1 mm. A further advantage of the frame is that it mechanically stabilizes the flow chamber and particularly prevents or minimizes a deformation of the chamber when cooling in an injection mold.

According to a preferred alternative, the cover comprises a frame. A foil is for instance clamped on or in a frame. This cover may fixedly be connected to the base plate of the flow chamber and may stabilize this flow chamber.

According to an advantageous embodiment, at least one liquid reservoir is formed in a manner that in the case of a closed input and output opening of the channel connected, a plug means can be inserted into the liquid reservoir for the air-tight lock. A plug means for the air-tight lock is a plug means which, when being engaged with the liquid reservoir, may close this reservoir in an air-tight manner. When inserting such a plug means, e.g. a filled pipette, the air displaced through this from the liquid reservoir may escape to the outside even if the channel connected is filled with liquid. An opening for ventilation arranged laterally in the liquid reservoir at a suitable height is a possibility offered. According to a preferred alternative, the liquid reservoir is formed in a manner expanding conically towards the opening. Liquid reservoirs of this type offer the advantage that plug means for air-tight locking may be inserted without the existing liquid level being changed as long as the plug means is above the liquid level. The liquid level and/or the shape of the liquid reservoir is preferably chosen such that the plug means is engaged above the liquid level with the liquid reservoir, that particularly the liquid is at most touched but not submersed into the liquid.

According to an advantageous embodiment of all above-described flow chambers, at least one input or output opening of a channel is arranged on a predetermined level of a liquid reservoir. This on the one hand has the advantage that only as of a certain liquid level the liquid may flow into the channel. On the other hand, a predetermined liquid level can be adjusted in other liquid reservoirs according to the principle of the communicating pipes.

BRIEF DESCRIPTION OF THE DRAWINGS

Preferred embodiments of a flow chamber according to the present invention are explained in detail by means of the drawing.

DETAILED DESCRIPTION OF THE INVENTION

Figure 1:
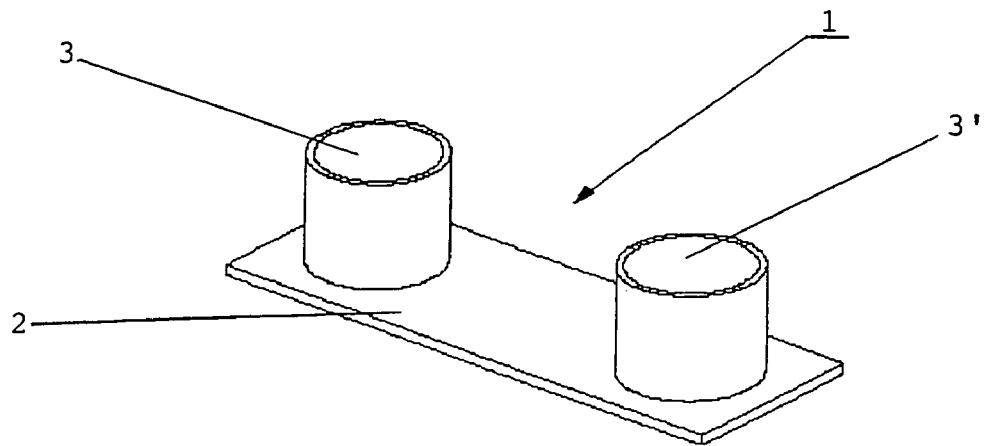
FIG. 1 shows the perspective view of a flow chamber according to the present invention.

FIG. 1 shows an embodiment of a flow chamber 1 with a base plate 2 and two circular liquid reservoirs 3 and 3'. The flow chamber 1 consists of plastics, with polycarbonate or cyclic olefins being preferably used for this purpose. Cyclic olefins have a low auto-fluorescence and a low birefringence and thus offer optimal optic properties. The base plate 2 has the typical outer dimensions of approx. 20 76 mm. In this form, the chamber can easily be fixed on a sample table of any microscope. Moreover, it may easily be sterilized and kept sterile.

Figure 2:
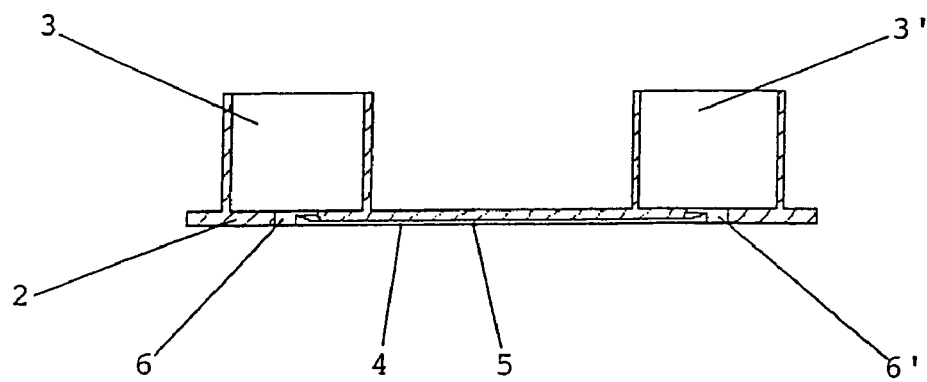
FIG. 2 shows a longitudinal section through a flow chamber according to the invention.

FIG. 2 shows a cut in the longitudinal direction through FIG. 1. A channel 4 with inlet and outlet openings 6 and 6' projecting upwardly from the base surface 2 extends within the base plate 2. The liquid reservoirs 3 and 3' are connected to each other through the channel 4. The liquid reservoirs typically have an outer diameter of 18 mm and a height of 18 mm. The diameter, however, may vary between 1 to 3 mm and the height may vary between 3 to 30 mm. In the case of a different liquid level in both reservoirs, the liquid may flow through the channel due to gravitation and the capillary forces.

To form a channel 4, which extends just under the lower surface of the plate, a recess or trench is formed in the base plate 2, said recess or trench having a depth of 0.1 to 5 mm and a width of 0.1 to 3 mm. The channel could also be provided just under the surface of the plate by forming a respective recess. The base plate 2 is typically formed as an injection molding part; particularly the base plate and the liquid reservoirs are manufactured as an injection molding part. A foil 5 is arranged over the recess in the base plate 2, said foil covering the recess and forming the bottom or cover of the channel 4. The foil may be attached over the base plate e.g. by adhesion, hot pressing or laminating. Moreover, the foil 5 may physically or chemically be surface-treated before application onto the base plate to enable e.g. an immobilization of the sample, as described above.

In order to make the flow chamber accessible to high-resolution microscopy, the foil 5 is thinner than 0.2 mm, typically between 0.1 and 0.2 mm in a portion essential for the examinations. The foil 5 is made of a highly transparent plastic material. In order to be able to use a condenser of a microscope, the portions of the flow chamber 1 essential for this purpose are not higher than 10 mm. The base plate 2 may also be made of a highly transparent plastic material.

Figure 3:
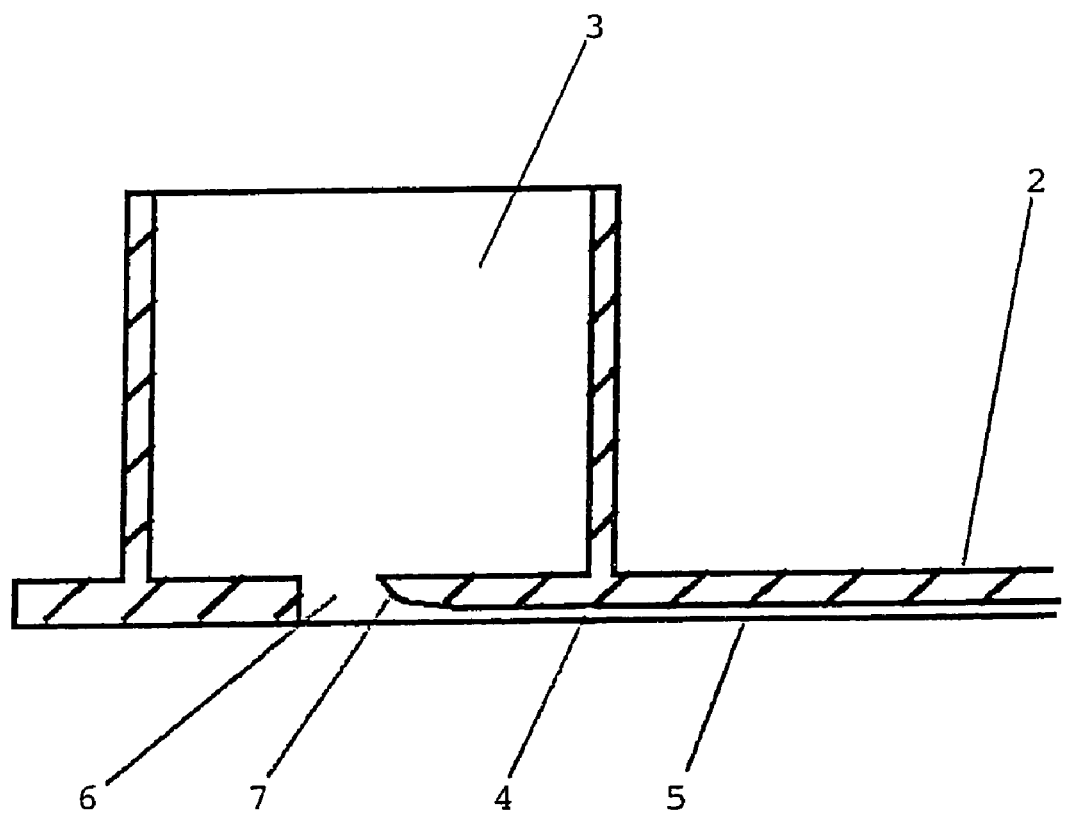
FIG. 3 shows an enlarged section of the flow chamber of FIG. 2.

FIG. 3 shows the arrangement of the liquid reservoir 3 above an inlet and outlet opening 6, 6'. The edge at the transition of the channel 4 into the inlet opening 6 has a rounding 7 in the form of a meniscus. In a channel portion in front of opening 6, the surface of the channel may be formed hydrophilic or hydrophobic. This may again e.g. be implemented by surface treatment of the foil 5 or the recess in the base plate 2 before application of the foil. By the rounding 7 or the above-described surface composition, surface tensions and drop formation, obstructing the liquid flow, may be avoided.

Figure 4:
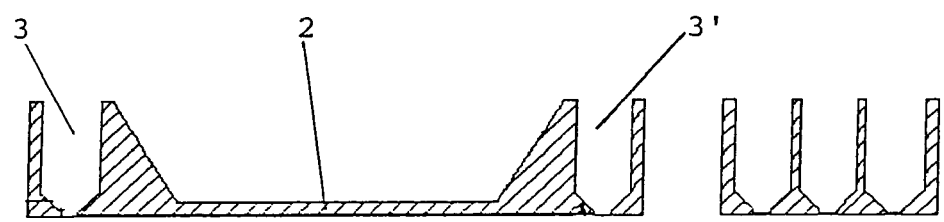
FIG. 4 shows a longitudinal section through a further embodiment of the flow chamber.
Figure 5:
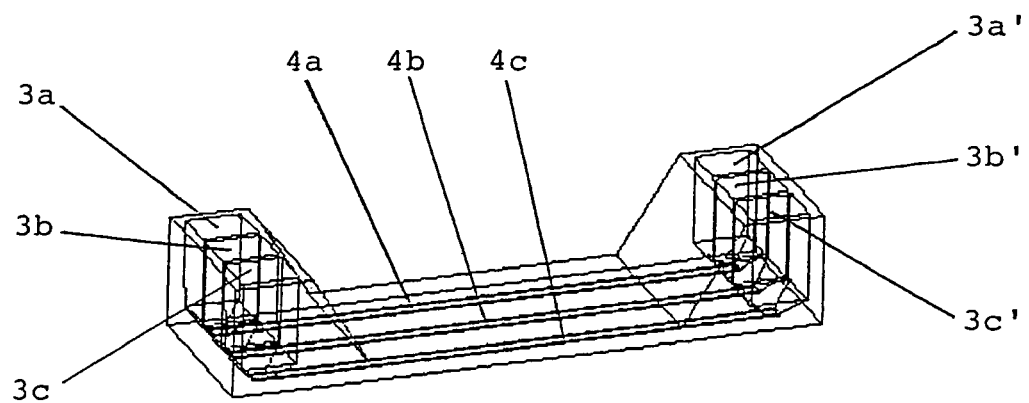
FIG. 5 shows a perspective view of the embodiment of the flow chamber of FIG. 4.

The embodiment of the flow chamber 1 in FIG. 4 has liquid reservoirs 3 and 3', which open in a funnel-like manner into the inlet and outlet openings 6 and 6'. In FIG. 5, three adjacently extending channels 4a, 4b and 4c with the respective liquid reservoirs 3a, 3a', 3b, 3b', 3c and 3c' are shown. As a further development, the number of channels may be between 12 and 96 pieces. The outer dimensions of the base plate is then typically 126×85 mm.

Figure 6:
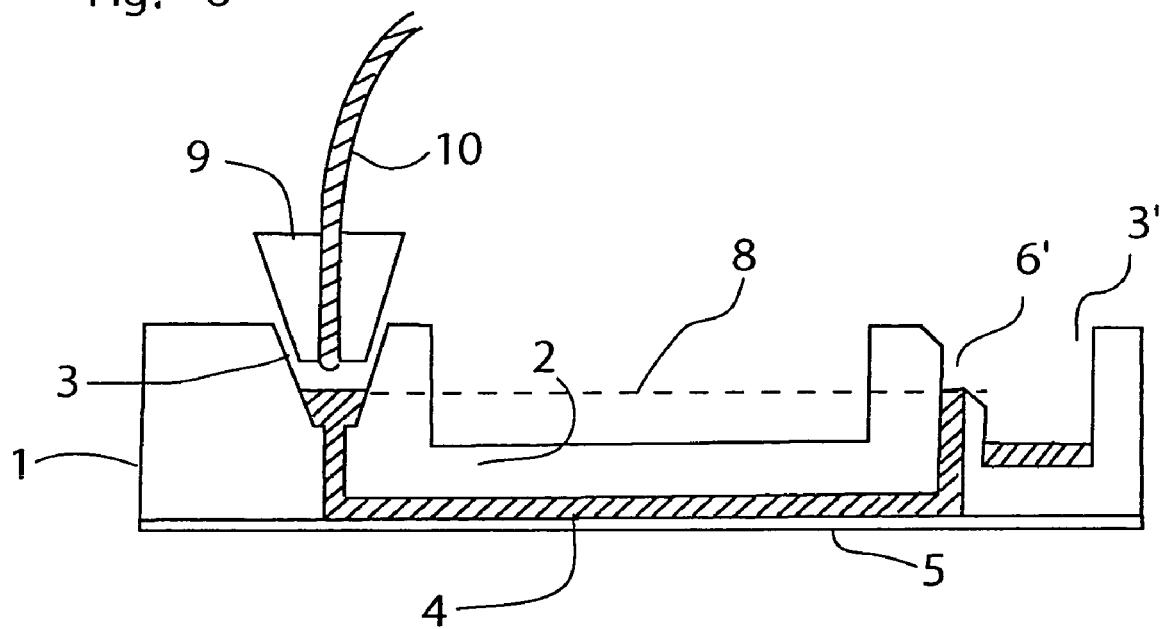
FIG. 6 shows a longitudinal section through a further embodiment of a flow chamber.

FIG. 6 shows an embodiment of a flow chamber 1 with a conically extending liquid reservoir 3. The liquid reservoir 3 is filled with liquid up to a predetermined level 8, wherein the level results according to the principle of the communicating pipes from the height of the outlet opening 6' of the reservoir 3'. A plug means 9 may be inserted into the reservoir 3. The shape of the plug means is adapted to the shape of the liquid reservoir. The plug means 9 is connected to a hose 10 filled with liquid. As soon as the plug means 9 is engaged with the liquid reservoir 3, it locks the reservoir in an air-tight manner. The plug means 9 will then planarly rest on the inner side of the reservoir 3 so that no liquid will be located between the inner side of the reservoir 3 and the side of the plug means 9 directed towards the inner side of the reservoir. Thus, the reservoir 3 and the channel 4 can fully be rinsed for a change of the liquid without liquid residue remaining in the reservoir 3. The liquid level 8 is chosen such that the plug means 9 engaged will be arranged directly above the liquid surface. An air bubble is then no longer located between the liquid and the plug means. The bevel of the outlet opening 6' allows an optimum discharge into the reservoir 3'.

The embodiments shown are exemplary and it is obvious that a plurality of further embodiments of a flow chamber is possible in the sense of the present invention, e.g. the intersection of two channels or joining of two channels to form a whole.

REFERENCE NUMERALS

1 Flow chamber
2 Base plate
3 Liquid reservoir

3' Liquid reservoir
3a Liquid reservoir
3b Liquid reservoir
3b' Liquid reservoir
3c Liquid reservoir
3c' Liquid reservoir
4 channel
4a channel
4b channel
4c channel
5 foil
6 inlet opening
6' outlet opening
7 rounding
8 liquid level
9 plug means
10 hose

The invention claimed is:

1. Flow chamber made of plastics as a sample carrier for light-optical examinations, comprising:
   a base plate having at least one channel formed therein, wherein the channel includes first and second inlet/outlet openings; and
   first and second liquid reservoirs in fluid communication with the at least one channel via the respective first and second inlet/outlet openings such that a fluid communicating system is arranged between the first and second liquid reservoirs;
   wherein the first and second liquid reservoirs are arranged on a first surface of the base plate over the respective first and second inlet/outlet openings and the at least one channel is formed in a second surface of the base plate opposite the first surface; and
   wherein the at least one channel includes a recess formed in the second surface of the base plate, and a foil disposed on at least a portion of the second surface of the base plate and covering the recess.

2. Flow chamber as claimed in claim 1, wherein the flow chamber is formed as one piece.

3. Flow chamber as claimed in claim 2, wherein the flow chamber is formed as an injection molding part.

4. Flow chamber as claimed in claim 1, wherein the at least one channel has a width of 0.01 to 20.0 mm and a height of 0.01 to 5 mm.

5. Flow chamber as claimed in claim 1, wherein the first and second liquid reservoirs directly adjoin the respective first and second inlet/outlet openings of the at least one channel.

6. Flow chamber as claimed in claim 1, wherein the base plate is made of non-birefringent and non-auto-fluorescent plastics.

7. Flow chamber as claimed in claim 1, wherein the base plate is made of cyclic olefins or polycarbonate.

8. Flow chamber as claimed in claim 1, wherein the foil has a thickness of less than 0.2 mm and is made of an optically high-class material.

9. Flow chamber as claimed in claim 1, wherein each said first and second liquid reservoir has a diameter of 1 to 20 mm and a height of 3 to 30 mm.

10. Flow chamber as claimed in claim 1, wherein at least one said first and second liquid reservoir opens in a funnel-like manner into the respective inlet/outlet opening of the at least one channel.

11. Flow chamber as claimed in claim 1, wherein the at least one channel has a rounding toward the channel on at least one edge at at least one said inlet/outlet opening.

12. Flow chamber as claimed in claim 1, wherein portions of walls of the at least one channel in front of at least one said inlet/outlet opening have a hydrophobic or a hydrophilic surface.

13. Flow chamber as claimed in at least claim 1, wherein at least an inner surface of the at least one channel is chemically and/or physically surface-treated and/or is functionalized by reactive groups and/or by macromolecules.

14. Flow chamber as claimed in claim 13, wherein the reactive groups consist of —COOH, —NH2, ketones or alcohols.

15. Flow chamber as claimed in claim 1, wherein the flow chamber comprises at least a portion with a predetermined gas permeability.

16. Flow chamber as claimed in at least claim 1, wherein the at least one channel includes at least two channels that are intersected in the base plate.

17. Flow chamber as claimed in claim 16, wherein the at least two channels are intersected in the base plate at an angle of 90°.

18. Flow chamber as claimed claim 1, wherein at least two channels of the at least one channel are joined to form one channel.

19. Flow chamber as claimed in claim 1, wherein at least one said liquid reservoir is adapted to receive a plug means that provides air-tight locking of the at least one said liquid reservoir when the respective inlet/outlet opening is closed.

20. Flow chamber as claimed in claim 1, wherein at least one said inlet/outlet opening of a channel is arranged on a predetermined level of a liquid reservoir.

21. Method of preparing samples for light-optical examinations, particularly by using a flow chamber according to claim 1, wherein a sample flow is generated by a system of communicating pipes in that a reservoir of a solution with the sample is connected via a thin channel with at least one further reservoir and the filling level of the reservoir differs at the beginning of the examination.

22. Flow chamber as claimed in claim 1, wherein the foil includes surface treatment that enables immobilization of a sample.

23. Flow chamber as claimed in claim 1, wherein the foil has a thickness of between 0.1 mm and 0.2 mm.

24. Flow chamber as claimed in claim 1, wherein at least the first surface of the base plate is planar and includes an open expanse between the first and second liquid reservoirs.

25. Flow chamber as claimed in claim 1, wherein the at least one channel is a plurality of channels.

26. Flow chamber as claimed in claim 25, wherein the plurality of channels are arranged so as to be mutually parallel.

27. Flow chamber as claimed in claim 1, wherein the base plate is made of plastics having low birefringence and low auto-fluorescent.

28. Flow chamber as claimed in claim 1, wherein the foil is physically or chemically surface-treated on at least a portion of the foil facing the recess.

29. Flow chamber as claimed in claim 28, wherein the foil is surface-treated to enable immobilization of a sample within the channel.

30. Flow chamber as claimed in claim 1, wherein the first and second surfaces of the base plate are planar, and are substantially parallel such that the base plate has a substantially uniform thickness as measured between the first and second surfaces.

* * * * *